2,912,436

BROMINATED ALKALOIDS

Frank L. Weisenborn, Middlebush, N.J., assignor to Olin Mathieson Chemical Corporation, New York, N.Y., a corporation of Virginia No Drawing. Application April 25, 1957
Serial No. 655,013

9 Claims. (Cl. 260—286)

This invention relates to new brominated alkaloids and their method of preparation. More particularly, the new brominated alkaloids of this invention may be represented (in the free base form) by the formula

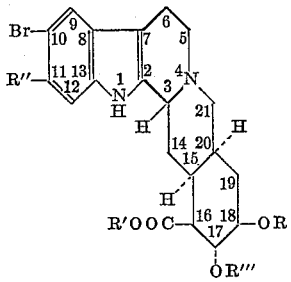

and include the acid-addition salts of these bases, wherein R is an esterifying group and includes the acyl radicals of such acids as carboxylic acids (preferably having less than ten carbon atoms) as exemplified by the lower alkanoic acids (e.g., acetic, propionic and enanthic acid), monocyclic aromatic carboxylic acids (e.g., benzoic, trimethoxybenzoic, 3,4-dichlorobenzoic and anisic acid), monocyclic heterocyclic acids (e.g., furoic and nicotinic acid), and sulfonic acids as exemplified by lower alkane sulfonic acids (e.g., methane sulfonic acid) and aromatic sulfonic acids (e.g., p-toluene sulfonic acid); R' is lower alkyl (preferably methyl); R" is hydrogen or methoxy; and R''' is hydrogen or methyl. The preferred radicals defined by R are the acyl radicals of lower alkanoic acids, benzoic acid and lower alkoxy-substituted benzoic acids.

These new compounds are physiologically active substances which possess ataractic and hypotensive activity. Thus, they may be used instead of reserpine in the treatment of psychiatric or hypertensive disorders, for which purpose they are administered parenterally or orally, as in the form of an injection solution, a tablet, syrup or elixir.

To prepare the compounds of this invention, the corresponding alkaloid, unsubstituted in the 10-position, is treated with bromine. This reaction is preferably conducted in an acidic medium (e.g., by dissolving the alkaloid in acetic acid). The reaction occurs readily at ambient temperature, although any other normal temperature may be employed. The hydrobromide salt initially formed can then be treated with an alkali to yield the free base, which in turn can be converted to an acid-addition salt in the usual manner, as by treatment with the desired non-toxic acid in an organic medium (e.g., methanol).

The following examples illustrate the invention (all temperatures being in centigrade):

EXAMPLE 1

10-bromoreserpine 5.00 g. of reserpine is dissolved in 100 ml. of acetic acid and treated dropwise with stirring at room temperature with 1.31 g. of bromine in 46 ml. of acetic acid. Near the end of the addition, a yellow precipitate appears which is filtered off, washed with acetic acid and dried to give about 4.82 g. of bromoreserpine hydrobromide. This salt is distributed between chloroform and 5% sodium bicarbonate solution, the chloroform extracts washed with water, dried over sodium sulfate and concentrated to dryness. The residue is recrystallized from methylene chloride-methanol yielding 10-bromoreserpine in colorless needles, about 3.1 g., M.P. about 285–286°.

EXAMPLE 2

10-bromodeserpidine 500 mg. of deserpidine is dissolved in 10 ml. of acetic acid and treated dropwise with a solution of 156 mg. of bromine in 10 ml. of acetic acid. The resulting yellow-orange solution is concentrated to dryness in vacuo and the residue dissolved in 5 ml. of methanol and made basic with ammonium hydroxide. The resulting precipitate is filtered off and recrystallized twice from methylene chloride-methanol to give 10-bromodeserpidine in colorless needles, about 205 mg., M.P. about 262–264°.

In a similar manner, by substituting methyl reserpate 18-acetate, methyl reserpate, methyl deserpidate, methyl pseudoreserpate, pseudoreserpine, or methyl reserpate 18-benzoate for reserpine in the procedure of Example 1, methyl 10-bromoreserpate 18-acetate, methyl 10-bromoreserpate, methyl 10-bromodeserpidate, methyl 10-bromopseudoreserpate, 10-bromopseudoreserpine and methyl 10-bromoreserpate 18-benzoate, respectively, are obtained.

The invention may be variously otherwise embodied within the scope of the appended claims.

What is claimed is:

1. A compound selected from the group consisting of free bases of the formula

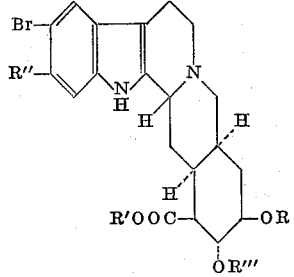

wherein R is selected from the group consisting of lower alkanoyl, benzoyl, and lower alkoxy-benzoyl, R' is lower alkyl, R" is selected from the group consisting of hydrogen and methoxy, and R''' is selected from the group consisting of hydrogen and methyl; and the pharmacologically acceptable acid-addition salts thereof.

2. 10-bromoreserpine.
3. 10-bromoreserpine hydrobromide.
4. 10-bromodeserpidine.
5. A process for preparing 10-bromoreserpine which comprises interacting reserpine with bromine in an acidic medium.

6. The process of claim 5, wherein the reaction is conducted in acetic acid.

7. A process for preparing 10-bromodeserpidine which comprises interacting deserpidine with bromine in an acidic medium.

8. The process of claim 7, wherein the reaction is conducted in acetic acid.

9. A process for preparing a compound selected from the group consisting of free bases of the formula

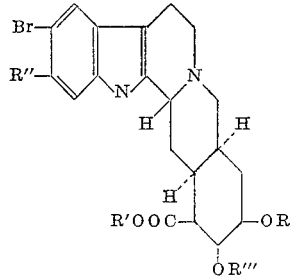

wherein R is selected from the group consisting of lower alkanoyl, benzoyl, and lower alkoxy-benzoyl, R' is lower alkyl, R'' is selected from the group consisting of hydrogen and methoxy, and R''' is selected from the group consisting of hydrogen and methyl; and the pharmacologically acceptable acid-addition salts thereof, which comprises interacting the corresponding compound selected from the group consisting of free bases of the formula

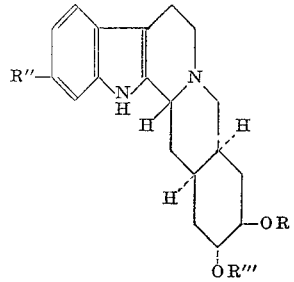

wherein R, R', R'', and R''' are as hereinbefore defined, and the pharmacologically acceptable acid-addition salts thereof, with bromine in an acidic medium.

References Cited in the file of this patent

Huebner: Journ. of the Am. Chem. Society, vol. 76, pp. 5792–5793 (1954).

Fuson: Advanced Organic Chemistry, pp. 286–87 (John Wiley and Sons, 1950), third printing.